(12) United States Patent
Sharma et al.

(10) Patent No.: US 11,379,137 B1
(45) Date of Patent: Jul. 5, 2022

(54) HOST LOAD BASED DYNAMIC STORAGE SYSTEM FOR CONFIGURATION FOR INCREASED PERFORMANCE

(71) Applicant: Western Digital Technologies, Inc., San Jose, CA (US)

(72) Inventors: Amit Sharma, Bengaluru (IN); Abhinandan Venugopal, Bengaluru (IN); Dinesh Kumar Agarwal, Bangalore (IN); Akhilesh Yadav, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/176,633

(22) Filed: Feb. 16, 2021

(51) Int. Cl.
*G06F 3/06* (2006.01)

(52) U.S. Cl.
CPC ............ *G06F 3/064* (2013.01); *G06F 3/0604* (2013.01); *G06F 3/0613* (2013.01); *G06F 3/0619* (2013.01); *G06F 3/0631* (2013.01); *G06F 3/0653* (2013.01); *G06F 3/0659* (2013.01); *G06F 3/0679* (2013.01)

(58) Field of Classification Search
CPC ...... G06F 3/064; G06F 3/0631; G06F 3/0653; G06F 3/0679; G06F 3/0604; G06F 3/0619; G06F 3/0613; G06F 3/0659
See application file for complete search history.

(56) References Cited

U.S. PATENT DOCUMENTS

| | | | |
|---|---|---|---|
| 8,510,582 B2 | 8/2013 | Naffziger et al. | |
| 8,826,051 B2 * | 9/2014 | Wakrat | G06F 1/3225 713/340 |
| 9,158,351 B2 * | 10/2015 | Varma | G06F 1/324 |
| 9,760,311 B1 | 9/2017 | Amir et al. | |
| 10,013,345 B2 | 7/2018 | Erez et al. | |
| 10,228,746 B1 | 3/2019 | Ram et al. | |
| 2016/0291676 A1 * | 10/2016 | Akimoto | G06F 1/3234 |
| 2019/0041951 A1 * | 2/2019 | Shapira | G06F 1/3287 |
| 2019/0065243 A1 * | 2/2019 | Eckert | G06F 9/3009 |
| 2019/0171277 A1 * | 6/2019 | Satou | G06F 1/3206 |
| 2020/0210108 A1 | 7/2020 | Palmer | |

* cited by examiner

*Primary Examiner* — Mark A Giardino, Jr.
(74) *Attorney, Agent, or Firm* — Michael Best & Friedrich LLP (57) ABSTRACT

A data storage device including, in one implementation, a non-volatile memory device including a memory block that includes a plurality of memory dies and a controller that is coupled to the non-volatile memory device and that allocates power to non-memory components based on a determined usage of the memory dies. The controller is configured to monitor a utilization of the plurality of memory dies, determine a utilization state of the plurality of memory dies, and calculate an amount of available power allocated to the plurality of memory dies in response to determining that the plurality of memory dies are in a low utilization state. The controller is also configured to determine whether the amount of available power is above a predetermined threshold, and reallocate the available power to one or more components within the data storage device in response to determining that the amount of available power is above the predetermined threshold.

20 Claims, 5 Drawing Sheets

HOST LOAD BASED DYNAMIC STORAGE SYSTEM FOR CONFIGURATION FOR INCREASED PERFORMANCE

BACKGROUND

This application relates generally to data storage devices, and more particularly, to a controller that allocates power to non-memory components based on a determined usage of the memory dies.

Generally, data storage devices, and specifically retail data storage devices, adhere to known or preset power restrictions to ensure maximum throughput of data through the data storage device. To obtain maximum throughput, the data storage device requires most or all of the memory dies within the data storage device to work in parallel. Accordingly, data storage devices typically consider and prioritize the power requirements of the memory dies first, such that the power is allocated to allow for each of the memory dies to have the maximum usable power available when needed. However, during times of reduced command loading, the memory dies may not require the maximum power that has been already allocated to them, causing the processing overhead of various hardware and firmware components to be the bottleneck for the data storage device throughput.

SUMMARY

Providing constant maximum power to memory dies within a data storage device can result in hardware and firmware overheads reducing performance in the event not all the memory dies are utilized. Reallocating power from idle memory dies improves performance of the data storage device by increasing operating frequencies, data transfer speeds, and memory die sense time.

One embodiment of the present disclosure includes a data storage device including a non-volatile memory device including a memory block that includes a plurality of memory dies. The data storage device further includes a controller that is coupled to the non-volatile memory device. The controller is configured to monitor a utilization of the plurality of memory dies, determine whether the plurality of memory dies are in a high utilization state, and calculate an amount of available power allocated to the plurality of memory dies in response to determining that the plurality of memory dies are not in the high utilization state. The controller is also configured to determine whether the amount of available power is above a predetermined threshold, and reallocate the available power to one or more components within the data storage device in response to determining that the amount of available power is above the predetermined threshold.

In another embodiment of the present disclosure, a method performed by a controller coupled to a non-volatile memory device monitors a utilization of a plurality of memory dies of the non-volatile memory device, determines whether the plurality of memory dies are in a high utilization state, and calculates an amount of available power allocated to the plurality of memory dies in response to determining that the plurality of memory dies are not in the high utilization state. The method further includes determining whether the amount of available power is above a predetermined threshold and reallocating the available power to one or more components within the data storage device in response to determining that the amount of available power is above the predetermined threshold.

In one embodiment of the of the present disclosure, an apparatus is provided. The apparatus includes a means to monitor a utilization of the plurality of memory dies, a means to determine whether the plurality of memory dies are in a high utilization state, and a means to calculate an amount of available power allocated to the plurality of memory dies in response to determining that the plurality of memory dies are not in the high utilization state. The apparatus also includes a means to determine whether the amount of available power is above a predetermined threshold, and a means to reallocate the available power to one or more components within the data storage device in response to determining that the amount of available power is above the predetermined threshold.

Various aspects of the present disclosure provide for improvements in data storage devices. For example, reallocating power from idle memory dies allows for reduced hardware and firmware overhead by allowing for increased operating frequency, data transfer rates, etc. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, etc.

Figure 1:
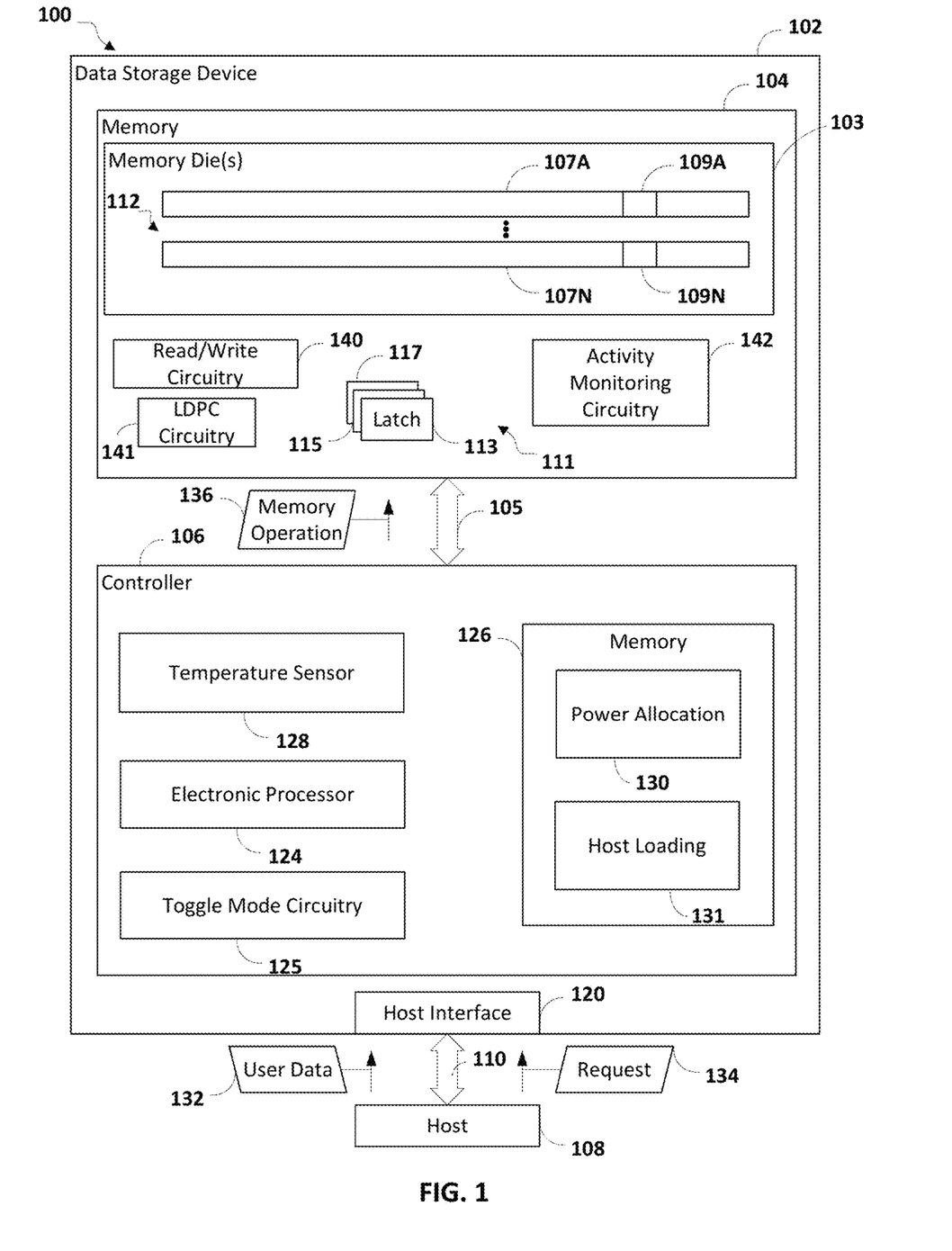
FIG. 1 is block diagram of one example of a system including a data storage device, according to some embodiments.

FIG. 1 is a block diagram of one example of a system 100 that includes power reallocation functionality, in accordance with some embodiments of the disclosure. In the example of FIG. 1, the system 100 includes a data storage device 102 in communication with a host device 108. The data storage device 102 includes a memory device 104 (e.g. non-volatile memory) that is coupled to a controller 106.

One example of the structural and functional features provided by the controller 106 are illustrated in FIG. 1. However, the controller 106 is not limited to the structural and functional features provided by the controller 106 in FIG. 1. The controller 106 may include fewer or additional structural and functional features that are not illustrated in FIG. 1.

The data storage device 102 and the host device 108 may be operationally coupled via a connection (e.g., a communication path 110), such as a bus or a wireless connection. In some examples, the data storage device 102 may be embedded within the host device 108. Alternatively, in other examples, the data storage device 102 may be removable from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 108 via the communication path 110, such as a wired communication path and/or a wireless communication path. For example, the data storage device 102 may include an interface 120 (e.g., a host interface) that enables communication via the communication path 110 between the data storage device 102 and the host device 108, such as when the interface 120 is communicatively coupled to the host device 108.

The host device 108 may include a processor and a memory. The memory may be configured to store data and/or instructions that may be executable by the processor. The memory may be a single memory or may include one or more memories, such as one or more non-volatile memories, one or more volatile memories, or a combination thereof. The host device 108 may issue one or more commands to the data storage device 102, such as one or more requests to erase data at, read data from, or write data to the memory device 104 of the data storage device 102. For example, the host device 108 may be configured to provide data, such as user data 132, to be stored at the memory device 104 or to request data to be read from the memory device 104. The host device 108 may include a mobile smartphone, a music player, a video player, a gaming console, an electronic book reader, a personal digital assistant (PDA), a computer, such as a laptop computer or notebook computer, any combination thereof, or other suitable electronic device.

The host device 108 communicates via a memory interface that enables reading from the memory device 104 and writing to the memory device 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the memory device 104 in accordance with any other suitable communication protocol.

The memory device 104 of the data storage device 102 may include a non-volatile memory (e.g., NAND, BiCS family of memories, or other suitable memory). In some examples, the memory device 104 may be any type of flash memory. For example, the memory device 104 may be two-dimensional (2D) memory or three-dimensional (3D) flash memory. The memory device 104 may include one or more memory dies 103. Each of the one or more memory dies 103 may include one or more memory blocks 112 (e.g., one or more erase blocks). Each memory block 112 may include one or more groups of storage elements, such as a representative group of storage elements 107A-107N. The group of storage elements 107A-107N may be configured as a wordline. The group of storage elements 107A-107N may include multiple storage elements (e.g., memory cells that are referred to herein as a "string"), such as a representative storage elements 109A and 109N, respectively.

The memory device 104 may include support circuitry, such as read/write circuitry 140, low-density parity check ("LDPC") circuitry 141, and activity monitoring circuitry 142 to support operation of the one or more memory dies 103. Although depicted as a single component, the read/write circuitry 140 may be divided into separate components of the memory device 104, such as read circuitry and write circuitry. The read/write circuitry 140 may be external to the one or more memory dies 103 of the memory device 104. Alternatively, one or more individual memory dies 103 may include corresponding read/write circuitry 140 that is operable to read from and/or write to storage elements within the individual memory die independent of any other read and/or write operations at any of the other memory dies. The LDPC circuitry 141 is configured to perform parity checks and other error correction on data retrieved by and/or sent to the memory dies 103. Accordingly, the LDPC circuitry 141 is configured to address bit errors within data transferred to/from the memory dies 103. Similarly, the activity monitoring circuitry 142 may be external to the one or more memory dies 103 and to the memory device 104. For example, the activity monitoring circuitry 142 may be embodied in the controller 106 as separate hardware circuitry or firmware. Alternatively, one or more individual memory dies 103 may include corresponding activity monitoring circuitry 142 that is operable activity monitoring functions, described below, within the individual memory die 103 independent of any activity monitoring at any of the other memory dies 103. In some examples, one or more activity monitoring operations may be performed using the activity monitoring circuitry 142. The memory device 104 may further include one or more latches (e.g., a set of latches 111 including latches 113, 115, and 117).

The activity monitoring circuitry 142 may be formed using logic gates such as AND, OR, XOR, and NOT gates, or programmable logic gates. In other examples, the activity monitoring circuitry 142 may be omitted from the memory device 104, and operations described with reference to the activity monitoring circuitry 142 may be performed by the read/write circuitry 140. In still further examples, the activity monitoring circuitry 142 may be omitted from the memory device 104, and operations described with reference to the activity monitoring circuitry 142 may be performed by the controller 106.

The controller 106 is coupled to the memory device 104 (e.g., the one or more memory dies 103) via a bus 105, an interface (e.g., interface circuitry), another structure, or a combination thereof. For example, the bus 105 may include multiple distinct channels to enable the controller 106 to communicate with each of the one or more memory dies 103 in parallel with, and independently of, communication with the other memory dies 103.

The controller 106 is configured to receive data and instructions from the host device 108 and to send data to the host device 108. For example, the controller 106 may send data to the host device 108 via the interface 120, and the controller 106 may receive data from the host device 108 via the interface 120. The controller 106 is configured to send data and commands (e.g., the memory operation 136, which may be a cycle operation of a memory block of the memory device 104) to the memory device 104 and to receive data from the memory device 104. For example, the controller 106 is configured to send data and a program or write command to cause the memory device 104 to store data to a specified address of the memory device 104. The write command may specify a physical address of a portion of the memory device 104 (e.g., a physical address of a word line of the memory device 104) that is to store the data.

The controller 106 is configured to send a read command to the memory device 104 to access data from a specified address of the memory device 104. The read command may specify the physical address of a region of the memory device 104 (e.g., a physical address of a word line of the memory device 104). The controller 106 may also be configured to send data and commands to the memory device 104 associated with background scanning operations, garbage collection operations, and/or wear-leveling operations, or other suitable memory operations.

The controller 106 may include a processor 124, a toggle mode circuitry 125, a memory 126, and other associated circuitry such as a temperature sensor 128. The memory 126 may be configured to store data and/or instructions that may be executable by the processor 124. The memory 126 may include power allocation commands 130 and a host loading module 131. The power allocation commands 130 and/or the host loading module 131 may be a hardware circuit or instructions that are executable by the processor 124.

The controller 106 may send the memory operation 136 (e.g., a read command) to the memory device 104 to cause the read/write circuitry 140 to sense data stored in a storage element. For example, the controller 106 may send the read command to the memory device 104 in response to receiving a request for read access from the host device 108. In response to receiving the read command, the memory device 104 may sense the storage element 107A (e.g., using the read/write circuitry 140) to generate one or more sets of bits representing the stored data. The toggle mode circuitry 125 is configured to control a toggle mode rate of the data storage device 102. The toggle mode rate is also referred to as a data transfer rate and corresponds to the speed at which data is transferred between the data storage device 102 and the host device 108. While shown as separate from the processor 124, it is contemplated that the toggle mode circuitry 125 may be integrated with and executed by the processor 124. It is also contemplated that the toggle mode circuitry 125 may be part of the memory device 104.

The temperature sensor 128 is configured to detect or determine a temperature of the data storage device 102 and/or the memory device 104. In some embodiments, a temperature of each memory block 112 can be determined by the temperature sensor 128. In other embodiments, a single temperature of the data storage device 102 is determined by the temperature sensor 128. The temperature sensor 128 is configured to provide the determined temperature information to the processor 124. While the temperature sensor 128 of FIG. 1 is shown as part of the controller 106, it is understood that one or more temperature sensors may be located within the memory device 104 to provide temperature values of one or more portions of the memory device 104.

Figure 2:
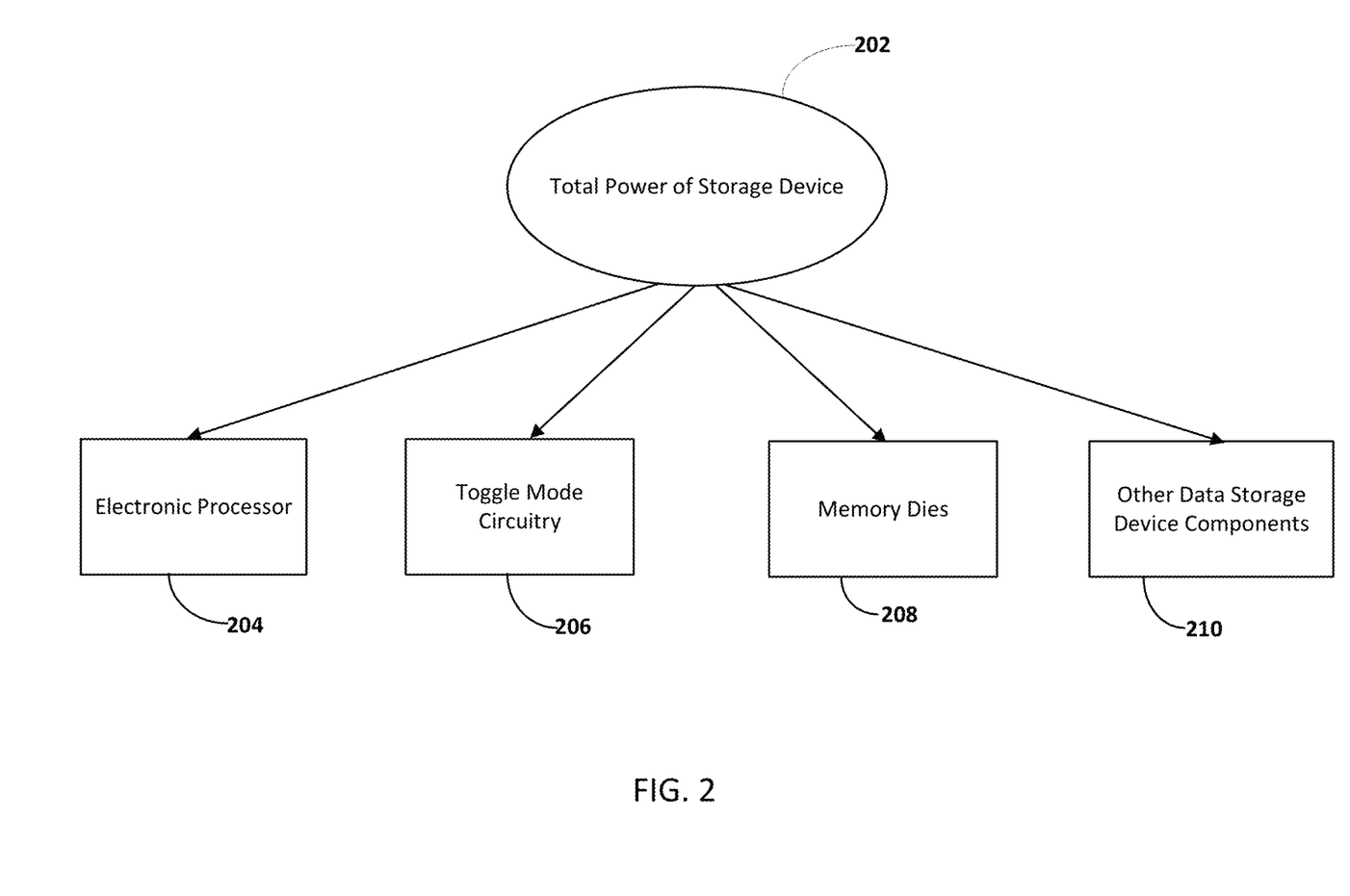
FIG. 2 is a diagram illustrating generally power allocation in a data storage device, according to some embodiments.

Turning now to FIG. 2, a diagram illustrating an exemplary power distribution scheme 200 for a data storage device, according to some embodiments. As shown in FIG. 2, a total available power 202 is distributed to a processor 204, a toggle mode circuitry 206, one or more memory dies 208, and other data storage device components 210. It is understood that the power distribution scheme 200 may be employed on a data storage device, such as data storage device 102, described above. For example, the processor 204 may be the processor 124 described above, and the one or more memory dies 208 may be the memory dies 103, described above. The other data storage device components 210 may include hardware accelerators, communication components, sorting logic, hardware automation components, or other suitable data storage device components. The other data storage components 210 may be associated with the data storage device 102 described above. The toggle mode circuitry 206 controls the data transfer rate between a host device, such as host device 108, and a data storage device, such as data storage device 102.

In some examples, the available power 202 is divided between the illustrated components with the memory dies 208 being prioritized over the other components. This prioritization can result in other components, such as the processor 204, the toggle mode circuitry 206, and the other storage device components 210 being power throttled to ensure that the memory dies 208 have sufficient power. However, in some implementations, the memory dies 208 may have a low utilization level, thereby allowing power normally reserved for the memory dies 208 to be allocated to other components of a data storage device, such as those described above.

Figure 3:
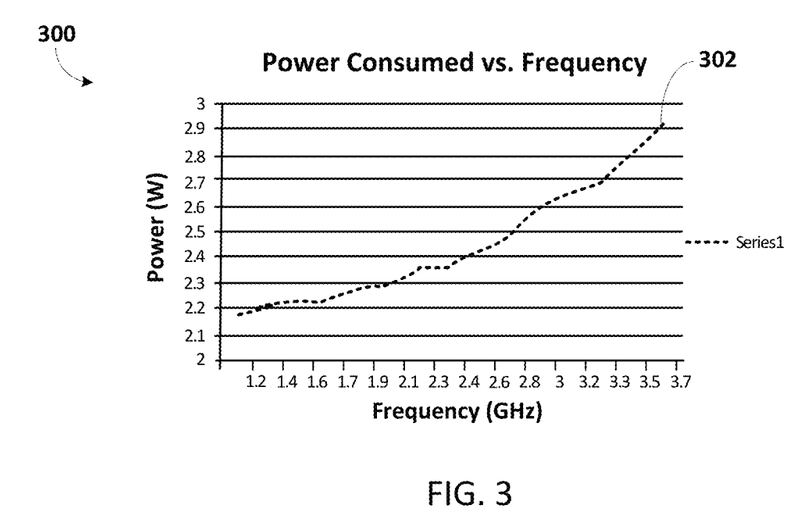
FIG. 3 is a chart illustrating power consumed by a processor over a frequency of operation range.

Turning now to FIG. 3, a chart 300 illustrating power consumption versus operating frequency for a processor, such as processor 124, is shown according to some embodiments. As shown in the chart 300, a power consumption 302 increases as the frequency increases. Accordingly, by providing additional power to the processor 124, the processor 124 may be operated at a higher frequency, thereby increasing the speed and performance of the processor 124.

Figure 4:
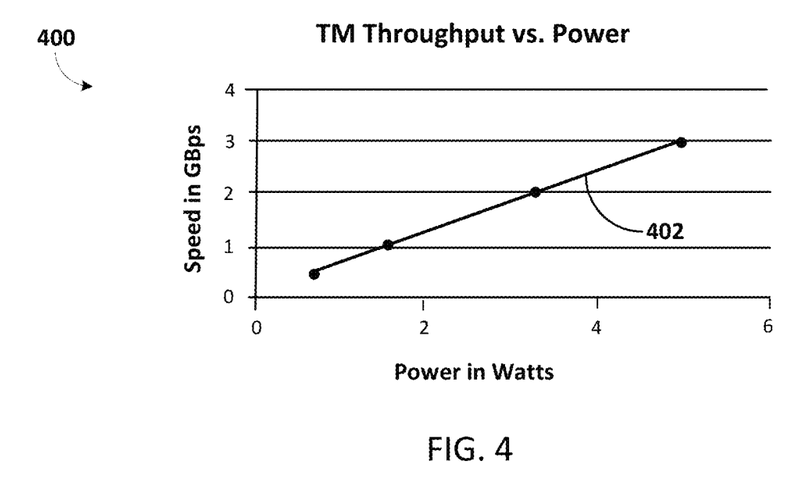
FIG. 4 is a chart illustrating data transfer mode speed versus power, according to some embodiments.

FIG. 4 is a chart 400 illustrating power consumption (expressed in Watts) versus toggle mode throughput. Toggle mode, as used herein, is a data transfer rate and the terms should be understood as being interchangeable. The toggle mode may be controlled via the toggle mode circuitry 125, discussed above. In some examples, toggle mode throughput, or data transfer rate, of a data storage device, such as data storage device 102, may be expressed in gigabits per second (GBps). However, speeds greater than gigabits per second or less than gigabits per second are also contemplated. As discussed above, the data transfer rate may regulate the speed of data transfer from a host device, such as host device 108, and a data storage device, such as data storage device 102. In other examples, the data transfer rate may provide an indication of data transfer to and from the memory dies 103 and the controller 106 of the data storage device 102. As shown in FIG. 4, the data transfer rate 304 increases as power consumption increases. Accordingly, making more power available to the toggle mode module and/or circuit of the data storage device 102 results in increases data transfer rates. In one embodiment, the processor 124 of the data storage device 102 controls the toggle mode via the toggle mode circuitry 125. However, other components, such as the controller 106, the read/write circuitry 140, etc. may be used to control the toggle mode circuitry 125, and thereby the toggle mode rate (data transfer speed).

Figure 5:
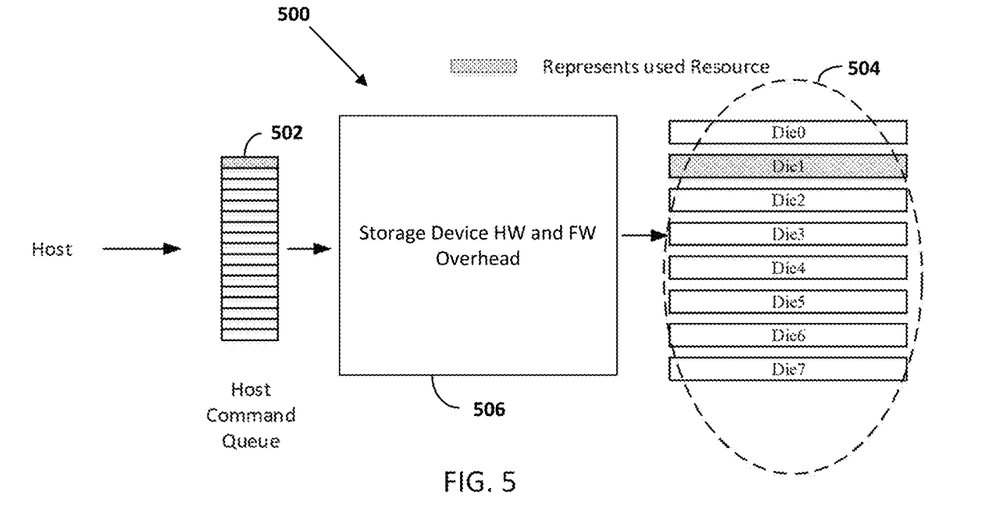
FIG. 5 is a block diagram illustrating a configuration of resource usage within a data storage device during a first benchmark test scenario, according to some embodiments.

As noted above, power within the data storage device 102 is generally allocated such that the memory dies 103 are able to receive their maximum required power when needed. To ensure that this power is available to the memory dies 103, available power to the remaining components of the data storage device 102 is throttled. However, specific data storage device operating modes may utilize the memory dies sparingly, allowing for power to be reallocated, as will be described in more detail below. Turning now to FIG. 5, a block diagram 500 illustrating resource allocation for low utilization states is shown, according to some embodiments. In some examples, the low utilization state may be associated with a general usage of the data storage device 102. In other examples, the low utilization state may be associated with a benchmarking process, such as A1, PCMark and/or AS-SSD. As shown in FIG. 5, when operating in a low utilization state, the host command queue 502 and the memory die usage 504 are both low. Storage device hardware and firmware processing overhead 506 may therefore be the bottleneck for operation in the low utilization state, as described in more detail below.

For example, as shown in FIG. 5, only a single host command queue slot and a single memory die is being utilized when operating in a particular low utilization state. In one embodiment, the host command queue usage is determined by the host loading module 131. Further, the memory die usage may be determined by one or more components or modules of the data storage device 102, such as via the activity monitoring circuitry 142. While FIG. 5 illustrates a low utilization state as utilizing only a single host command slot and a single memory die, it is contemplated that the data storage device 102 may be in a low utilization state when the utilization of the host command queue 502 and/or memory dies 504 falls below a predetermined threshold. In one embodiment, the predetermined threshold is 30% utilization. However, predetermined values of more than 30% and less than 30% are also contemplated.

As noted above, while in a low utilization state, the hardware and firmware processing overhead 506 may limit or throttle the speed at which a command may be executed to completion. For example, the total time to complete a host command in the low utilization state may be equal to: Hardware/Firmware Processing Overhead Time+Sense Time (e.g. Die Throughput)+Data Transfer Time. As noted above, the data transfer time may be limited based on the power available to the toggle mode circuitry 125 of the data storage device 102. Thus, by reducing any of the above parameters, the command completion time may be reduced. As sense time is set by the memory dies 103, reducing the hardware/firmware processing overhead time and/or the data transfer time are the only dynamically adjustable parameters.

Figure 6:
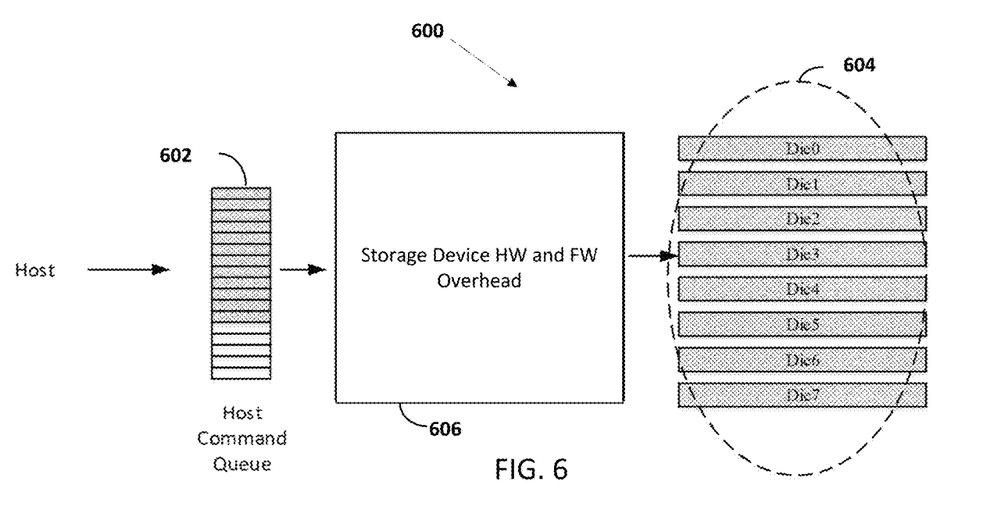
FIG. 6 is a block diagram illustrating a configuration of resource usage within a data storage device during a second benchmark test scenario, according to some embodiments.

Turning now to FIG. 6, a block diagram 600 illustrating resource allocation for high utilization states is shown, according to some embodiments. In some examples, the high utilization state may be associated with a general usage of the data storage device 102. For example, high utilization states may include sequential and random command processing. As shown in FIG. 6, when operating in a high utilization state, the host command queue 602 and the memory die usage 604 are both high. For example, during a high utilization state, most or all of the memory dies 604 may be used to facilitate the required operation. Furthermore, a substantial amount of the host command slots in the host command queue 602 may be utilized as well when operating in the high utilization state.

In contrast to the low utilization states described above, the time to complete a host command request in a high utilization state is generally limited by the sense time (e.g. die throughput) of the dies, rather than storage device hardware and firmware processing overhead 606. This is generally due to the fact that when in a high utilization state the processor, such as processor 124, can work on subsequent commands while the dies are performing a previous operation associated with the current host command.

Figure 7:
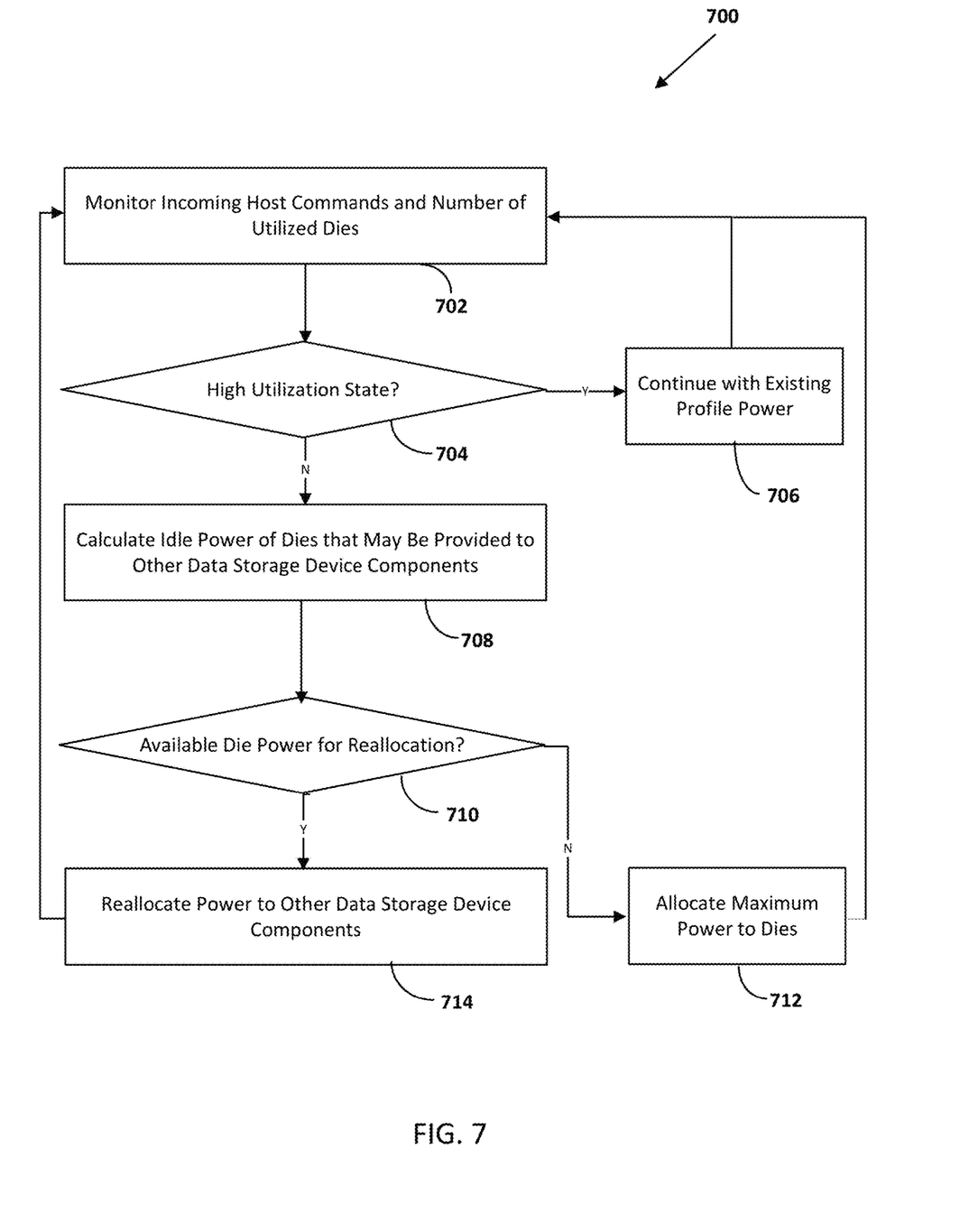
FIG. 7 is a flow chart illustrating a process for allocating power within a data storage device.

Turning now to FIG. 7, a process 700 for power reallocation is described according to some embodiments. In one embodiment, the process 700 is performed by the controller 106 of the data storage device 102, such as via the processor 124 in coordination with the memory 126. Further, while operations are described as being performed by any specific component, such as the controller 106, it is further understood that one or more components within the controller 106 may be performing the specific operation. However, in other examples, one or more other components described above may be used to perform the process 700. Further, while the process 700 is described in conjunction with the data storage device 102 described above, it is understood that the process 700 may be performed by various data storage devices, as would be understood by one having skill in the art.

At block 702, the incoming host commands and number of utilized memory dies 103 are tracked. In one embodiment, the incoming host commands and number of utilized memory dies 103 are tracked in real time. In other embodiments, the incoming host commands and number of utilized memory dies 103 are tracked only when new commands are provided by the host device 108. In some examples, the utilization of the memory dies 103 is based on the amount of memory dies 103 utilized in parallel operation for a specific host load. In other examples, the overall utilization of the memory dies 103 within the data storage device 102 is tracked. In one embodiment, the activity monitoring circuitry 142 provides the data related to the utilization of the memory dies 103 to the controller 106. Similarly, the host loading module 131 may provide the data related to tracking the incoming host commands.

At block 704, the controller 106 determines whether the data storage device 102 is operating in a high utilization state. In some embodiments, the controller 106 may determine whether the data storage device 102 is operating in a high utilization state based on the percentage of utilized host command slots and/or memory dies 103 currently being utilized. For example, as described above, the controller 106 may determine that the data storage device 102 is in a high utilization state where 75% or more of the memory dies 103 and/or host command slots are utilized. However, percentages of less than 75% or more than 75% are also contemplated, and 75% is merely a specific example for ease of understanding. In some examples, the controller 106 only evaluates the percentage of utilized memory dies 103 to determine whether the data storage device 102 is in a high utilization state. In one embodiment, the controller 106 determines that the data storage device 102 is in a high utilization state based on the number of currently utilized (active) memory dies 103 being greater than the number of currently queued commands. Conversely, the controller 106 may determine that the data storage device 102 is not in the high utilization state based on the number of currently utilized (active) memory dies 103 being less than or equal to the number of currently queued commands. Where the controller 106 determines that the data storage device 102 is not in a high utilization state, the data storage device 102 is determined to be in a low utilization state.

In response to determining that the data storage device 102 is in a high utilization state, the controller 106 continues operating with an existing power allocation profile at process block 706 and continues monitoring the incoming host commands and number of utilized dies at process block 702. In response to determining that the data storage device 102 is not in a high utilization state (i.e. in a low utilization state), the controller 106 calculates an idle or available amount of power previously allocated to the memory dies 103 that can be reallocated to the other components within the data storage device 102. For example, in response to determining that 50% of the memory dies 103 are idle (e.g. not utilized), the controller 106 calculates an amount of power previously allocated to the 50% of unallocated memory dies 103 that may be reallocated to other components within the data storage device 102. In one embodiment, approximately 50% of the allocated maximum power for a memory die 103 may be reallocated to other devices. However, allocations of more than 50% of the allocated maximum power or less than 50% of the allocated maximum power may also be used. The controller 106 may also consider a minimum power requirement for the memory dies 103 and ensure that the minimum power level is not reallocated to other device components. The controller 106 may then sum all of the available power from each memory die 103 to determine a total amount of power that is reallocatable to other components within the data storage device 102.

At process block 710, the controller 106 determines whether there is available power to provide to other components within the data storage device 102. For example, where the determined idle power of the memory dies 103 determined in block 708 is less than a predetermined threshold of total available power, the controller 106 may determine that there is not sufficient power to provide additional power to the other components within the data storage device 102. For example, the predetermined threshold may be 10% of the total available power. However, predetermined threshold values of more than 10% of the total available power or less than 10% of the total available power are also contemplated. In other embodiments, the controller 106 may determine whether the available idle power of the memory dies 103 is sufficient to improve the performance of any of the components within the data storage device 102. For example, if the other components require a minimum amount of power to improve performance, the power may not be reallocated to the other components where the amount of available power does not meet the required minimum.

In response to determine that there is not available power to provide to other components within the data storage device 102, the controller 106 allocates the maximum power to the memory dies 103 at block 712 and continues monitoring the incoming host commands and number of utilized dies at process block 702. In response to determining that there is available power to provide to other components within the data storage device 102, the controller 106 reallocates power from the memory dies 103 to one or more components within the data storage device 102 at block 714 and continues monitoring the incoming host commands and number of utilized dies at process block 702. For example, additional power may be allocated to the processor 124 to increase the operating frequency of the processor 124.

Further, additional power may be provided to one or more components (e.g. toggle mode circuitry 125) to increase the toggle mode speed (data transfer speed). Additional power may further be provided to various components to increase operating frequency or capabilities of components or functions such as hardware accelerators, communication components, sorting logic, hardware component automation, etc.

In some embodiments, the available power may be reallocated based on one or more priority configurations. For example, increasing the operating frequency of the processor 124 may be given the highest priority, with other components or functions being lower on the priority rankings. In some embodiments, maximum power may first be allocated to the highest priority component or function, and remaining power is then allocated to other components or functions in a similar manner. In other embodiments, the available power is divided between the different components or functions proportionally based on a priority or ranking of the components or functions. For example, 50% of the available power may be provided to a first, highest ranked, function, such as increasing the operating frequency of the processor 124. The remaining 50% of the available power may then be divided among the remaining components and functions accordingly. While the operating frequency of the processor 124 is described as being the highest ranking component or function, it is contemplated that the ranking of the components and/or functions may be determined based on the type, function, application of the data storage device 102, etc. In still further examples, the priority rankings may be based on which component or system is currently the bottleneck for performing the desired operation. For example, if the processor 124 is the component which is limiting performance for a given operation, priority may be given to the processor 124 over other components. In still further examples, the available power may be reallocated based on controller 106 determining which component or components would see the most increase in performance from the increase in power. For example, where allocating the power to toggle mode circuitry 125 results in an increase of 10 MBps of speed, but only a 5 MBps increase in speed if provided to the processor 124, the controller 106 may optimize performance by providing the available power to the toggle mode circuitry 125 over the processor 124.

It is contemplated that by dynamically reallocating power to certain components of the data storage device 102, as described above, command completion times when in low utilization states may be increased by approximately 23%. However, improvements in command completion times may vary based on the number of commands, type of commands, etc. However, when power reallocation is available, it is contemplated that reductions in command completion times will occur when the power is dynamically reallocated as described above.

In another embodiment of the process 700, the sense time (e.g. data throughput) of the memory dies 103 may be reduced to further or alternatively improve command completion times. Reduction of sense time within memory dies has historically led to an increase in bit-error rates, resulting in correction circuitry, such as LDPC circuitry 141, requiring more correction time. However, where there is available power resulting from idle memory dies, as determined in blocks 708-710, above, power may further be reallocated to the LDPC circuitry 141 at block 714. In one embodiment, the LDPC circuitry 141 is in communication with the read/write circuitry 140. Additionally, in some embodiments the LDPC circuitry 141 may be integrated with the controller 106 instead of, or in conjunction with, the memory device 104.

By providing more power to the LDPC circuitry 141, the correction capability is improved, reducing the error correction time. Thus, where there is available power, the sense time of the memory dies 103 may be reduced and the increase in bit-error rate can be addressed by providing some or all of the available power to the LDPC circuitry 141 to increase the correction capability of the LDPC circuitry 141. In some embodiments, the sense time of the memory dies 103 may be decreased and the available power provided to the LDPC circuitry 141 instead of reallocating the available power to other components and/or functions, such as the processor 124, toggle mode circuitry 125, etc. as described above. In other embodiments, the sense time of the memory dies 103 may be decreased and available power provided to the LDPC circuitry 141 in addition to reallocating power to the other components as described above. For example, the controller 106 may allocate the available power based on an application, the total amount of available power, etc.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device, comprising:
   a non-volatile memory device including a memory block, the memory block including a plurality of memory dies; and
   a controller coupled to the non-volatile memory device and configured to:
   monitor a utilization of the plurality of memory dies;
   determine whether the plurality of memory dies are in a high utilization state,
   calculate an amount of available power allocated to the plurality of memory dies in response to determining that the plurality of memory dies are not in the high utilization state,
   determine whether the amount of available power is above a predetermined threshold, and
   reallocate the calculated available power to one or more components within the data storage device in response to determining that the amount of available power is above the predetermined threshold.

2. The data storage device of claim 1, wherein the controller is further configured to continue with an existing power allocation profile in response to determining that the plurality of memory dies are in the high utilization state.

3. The data storage device of claim 1, wherein the controller is further configured to allocate maximum power to the plurality of memory dies in response to determining that the amount of available power is not above the predetermined threshold.

4. The data storage device of claim 1, wherein the controller is configured to determine whether the plurality of memory dies are not in the high utilization state based on a predetermined percentage of the plurality of memory dies being idle.

5. The data storage device of claim 1, wherein the controller is configured to determine whether the plurality of memory dies are not in the high utilization state based on a number of active memory dies that is less than or equal to a number of queued commands received from a host device.

6. The data storage device of claim 1, wherein, to reallocate the available power to the one or more components within the data storage device in response to determining that the amount of available power is above the predetermined threshold, the controller is further configured to reallocate power to a processor of the controller to increase operating frequency of the processor.

7. The data storage device of claim 1, wherein, to reallocate the available power to the one or more components within the data storage device in response to determining that the amount of available power is above the predetermined threshold, the controller is further configured to reallocate the available power to a toggle mode circuit to increase a data throughput of the data storage device.

8. The data storage device of claim 7, wherein the controller is further configured to:
   reduce a sense time of the plurality of memory dies, and
   reallocate the available power to a low-density parity check circuit.

9. A method performed by data storage device having a controller coupled to a non-volatile memory device, the method comprising:
   monitoring a utilization of a plurality of memory dies of the non-volatile memory device;

determining whether the plurality of memory dies are in a high utilization state;

calculating an amount of available power allocated to the plurality of memory dies in response to determining that the plurality of memory dies are not in the high utilization state;

determining whether the amount of available power is above a predetermined threshold; and reallocating the available power to one or more components within the data storage device in response to determining that the amount of available power is above the predetermined threshold.

10. The method of claim 9, wherein determining whether the plurality of memory dies are not in the high utilization state is based on a predetermined percentage of the plurality of memory dies are idle.

11. The method of claim 9, wherein determining whether the plurality of memory dies are not in the high utilization state is based on a number of active memory dies that is less than or equal to a number of queued commands received from a host device.

12. The method of claim 9, wherein reallocating the available power to the one or more components within the data storage device in response to determining that the amount of available power is above the predetermined threshold further includes reallocating power to a processor of the controller to increase operating frequency of the processor.

13. The method of claim 9, wherein reallocating the available power to the one or more components within the data storage device in response to determining that the amount of available power is above the predetermined threshold further includes reallocating the available power to a toggle mode circuit to increase a data throughput of the data storage device.

14. The method of claim 9, further comprising:
configuring the plurality of memory dies to reduce a sense time of the plurality of memory dies; and
reallocating the available power to a low-density parity check circuit.

15. An apparatus, comprising:
means for monitoring a utilization of a plurality of memory dies within a memory block of the apparatus;
means for determining whether the plurality of memory dies are in a high utilization state;
means for calculating an amount of available power allocated to the plurality of memory dies in response to determining that the plurality of memory dies are not in the high utilization state;
means for determining whether the amount of available power is above a predetermined threshold; and
means for reallocating the available power to one or more components within a data storage device in response to determining that the amount of available power is above the predetermined threshold.

16. The apparatus of claim 15, wherein the means for determining whether the plurality of memory dies are not in the high utilization state based on a predetermined percentage of the plurality of memory dies being idle.

17. The apparatus of claim 15, wherein the means for determining whether the plurality of memory dies are not in the high utilization state based on a number of active memory dies that is less than or equal to a number of queued commands received from a host device.

18. The apparatus of claim 15, wherein the means for reallocating the available power to the one or more components within the data storage device in response to determining that the amount of available power is above the predetermined threshold further includes reallocating power to a processor of the apparatus to increase operating frequency of the processor.

19. The apparatus of claim 15, wherein the means for reallocating the available power to the one or more components within the data storage device in response to determining that the amount of available power is above the predetermined threshold further includes reallocating the available power to a toggle mode circuit of the apparatus to increase a data throughput of the data storage device.

20. The apparatus of claim 15, further comprising:
means for reducing the sense time of the plurality of memory dies; and
means for reallocating the available power to a low-density parity check circuit.

* * * * *